Nov. 30, 1937.     J. LAROCCA     2,100,809
SELF STARTING SINGLE PHASE ALTERNATING CURRENT INDUCTION MOTOR
Filed Sept. 12, 1934

INVENTOR
James Larocca

Patented Nov. 30, 1937

2,100,809

UNITED STATES PATENT OFFICE 2,100,809

SELF-STARTING SINGLE PHASE ALTERNATING CURRENT INDUCTION MOTOR

James Larocca, Chicago, Ill., assignor to Speedway Manufacturing Company, Cicero, Ill., a corporation of Illinois Application September 12, 1934, Serial No. 743,681

6 Claims. (Cl. 172—278)

My invention relates to electric motors and more particularly to self-starting single phase alternating current induction motors.

Single phase induction motors have no inherent starting ability and therefore various means have been resorted to for bringing such motors up to speed after which they have excellent operating characteristics. One of the devices frequently used to start single phase induction motors is the shaded pole arrangement, which, however, as ordinarily constructed is inefficient particularly under operating conditions and results in waste of energy and heating of the motor.

An object of the present invention is to provide a new and improved self-starting single phase induction motor.

A further object is to provide a starting means for such a motor, the effect of which is substantially eliminated in the normal operation of the motor.

A still further object is to provide a motor which it is economical to construct and simple to assemble.

Other objects and advantages will appear as the description proceeds.

Figure 1:
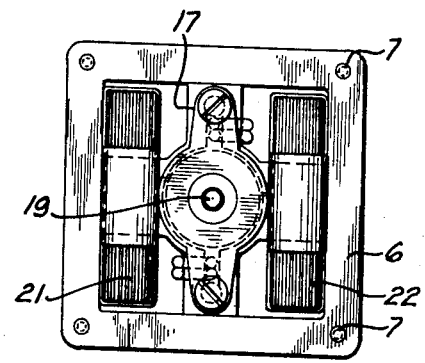
Figure 2:
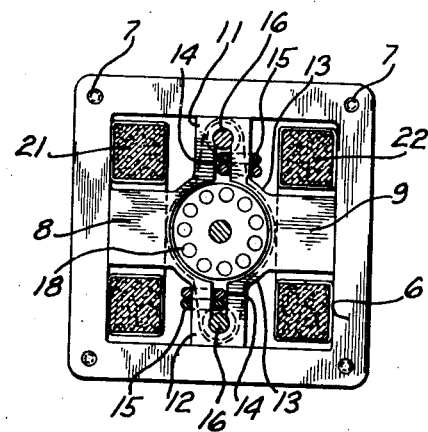
Figure 3:
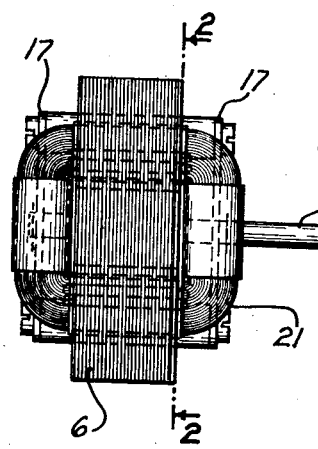
Figure 4:
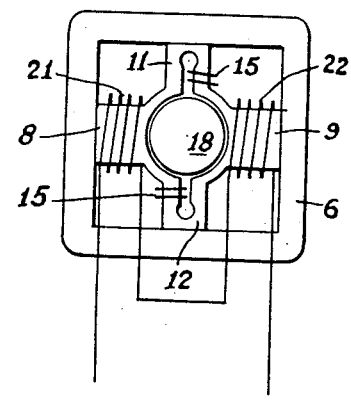

A complete understanding of the invention may be had by reference to the following description taken in conjunction with the accompanying drawing in which Fig. 1 is a front elevation of a motor embodying the invention, Fig. 2 is a sectional view taken on line 2—2 of Fig. 3, Fig. 3 is a side elevation of the motor, and Fig. 4 is a wiring diagram.

Referring first to the magnetic structure, a rectangular field piece 6 is constructed of laminations of magnetic sheet metal such as silicon steel and the laminations may be held together by any suitable means such as rivets 7. The portions blanked from the center of the rectangles may be used to form a cruciform pole piece structure which may be pressure fit into the rectangular field structure or secured in any other suitable manner.

The pole piece structure comprises in the preferred embodiment of the invention, two main pole pieces 8 and 9, and two auxiliary pole pieces 11 and 12, the main and auxiliary poles being joined by small interconnecting yokes 13 forming an integral pole piece structure. The main pole pieces preferably have larger pole faces than the auxiliary poles. The pole faces of the auxiliary poles are divided by slots 14 which also divide the auxiliary pole pieces into two legs, one of which is surrounded by a short-circuited winding 15 in each of the auxiliary pole pieces to form shaded poles in the auxiliary pole pieces. The outer end of these slots may be enlarged to receive bolts 16 for clamping the pole piece laminations together and for supporting bearing plates 17. A squirrel cage type of rotor 18 is mounted on a shaft 19 journalled in the bearing plates 17.

The main pole pieces 8 and 9 are provided with serially connected coils 21 and 22 which are wound so that the magnetic fluxes set up thereby will be cumulative, passing for example at one instance from pole piece 8 through the rotor to pole piece 9 and dividing in the field structure 6 to return in parallel to pole piece 8.

While it is not desired to restrict the invention to any particular theory of operation it appears that when the coils 21 and 22 are energized with alternating current a magnetic flux will be set up at one point of a cycle tending to pass through the rotor. The rotor being at a standstill an opposing flux will be induced therein as long as the current in the coils is rising, thereby producing a high leakage flux through the auxiliary poles. When the current reaches its maximum value no further current is induced in the rotor and the opposing flux ceases and the leakage flux is reduced. After the current in the main coils has passed its maximum value it will decrease and an opposing current and flux will again be set up by the rotor producing a leakage flux through the auxiliary poles in the opposite direction from the leakage flux previously set up. It will thus be seen that a large alternating leakage flux will exist in the auxiliary pole pieces as long as the rotor is standing still, and the auxiliary poles being shaded will exert a strong starting torque on the rotor. As the rotor acquires speed, however, its impedance will increase thereby, increasing the impedance of the coils 21 and 22 to reduce the current in these coils with a resultant reduction in the leakage fluxes. Thus, whereas, in the usual type of shaded pole motor the operating current is even larger than the starting current, in the motor described above the operating current is smaller than the starting current due to the fact that the auxiliary shading poles are in effect substantially idle during operation with the result that this motor will operate at a lower temperature and at a higher efficiency.

While the invention has been described with reference to a particular embodiment thereof it will be understood that many changes and modifications may be made therein without departing from the spirit and scope of the invention.

What I claim as new and desire to secure by United States Letters Patent is as follows:

1. An electric motor comprising a rotor, a magnetic field structure including alternately arranged unshaded main poles and auxiliary poles magnetically connected in series, and magnetic means completing the magnetic circuit between adjacent poles, windings on the main poles, and shading windings on the auxiliary poles.

2. An electric motor comprising a rotor, a cruciform magnetic field structure providing alternately unshaded main and auxiliary poles magnetically connected in series, a magnetic frame structure completing the magnetic circuit between adjacent poles, windings on the main poles arranged to excite their adjacent ends to opposite polarities, and shading windings on the auxiliary poles.

3. An electric motor comprising a rotor, a magnetic field structure including alternately arranged unshaded main poles and auxiliary poles magnetically connected in series, and magnetic means completing the magnetic circuit between adjacent poles, windings on the main poles, and shading windings mounted solely on said auxiliary poles and surrounding parts only thereof.

4. An electric motor comprising a rotor, a cruciform magnetic field structure providing alternately unshaded main and auxiliary poles magnetically connected in series, a magnetic frame structure completing the magnetic circuit between adjacent poles, windings on the main poles arranged to excite their adjacent ends to opposite polarities, and shading windings mounted solely on said auxiliary poles and surrounding parts only thereof.

5. An electric motor comprising a rotor, a magnetic field structure including alternately arranged unshaded main poles and auxiliary poles magnetically connected in series, and magnetic means completing the magnetic circuit between adjacent poles, windings on the main poles, said auxiliary poles being provided with longitudinal slots extending outwardly from their innermost ends, and shading windings extending through said slots and surrounding parts of said auxiliary poles.

6. An electric motor comprising a rotor, a cruciform magnetic field structure providing alternately unshaded main and auxiliary poles magnetically connected in series, a magnetic frame structure completing the magnetic circuit between adjacent poles, windings on the main poles arranged to excite their adjacent ends to opposite polarities, said auxiliary poles being provided with longitudinal slots extending outwardly from their innermost ends, and shading windings extending through said slots and surrounding parts of said auxiliary poles.

JAMES LAROCCA.